May 1, 1923.

W. N. SCHNEIDER

ANGLE IRON MACHINE

Filed May 28, 1921

W. N. Schneider
INVENTOR

BY Victor J. Evans
ATTORNEY

WITNESS:

May 1, 1923.
W. N. SCHNEIDER
1,453,953
ANGLE IRON MACHINE
Filed May 28, 1921
3 Sheets-Sheet 2
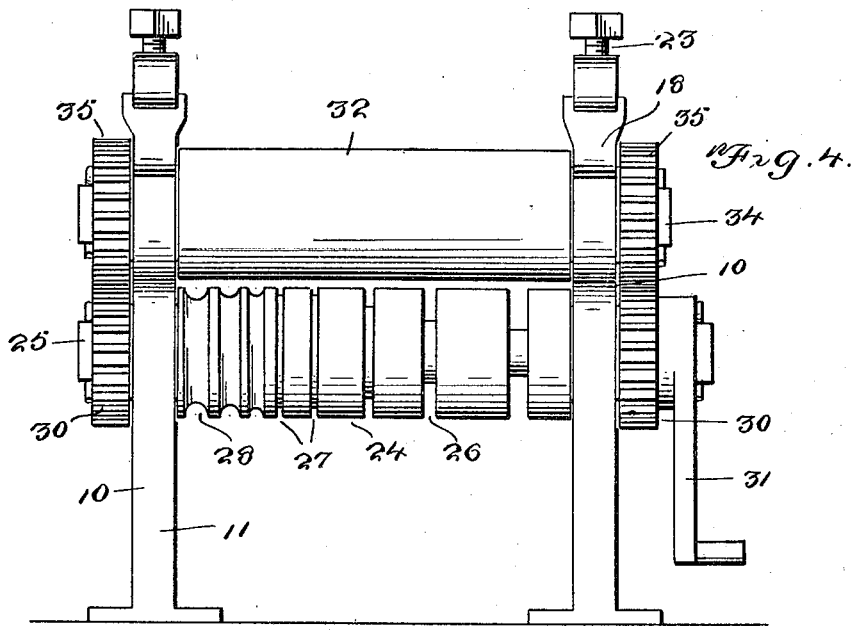
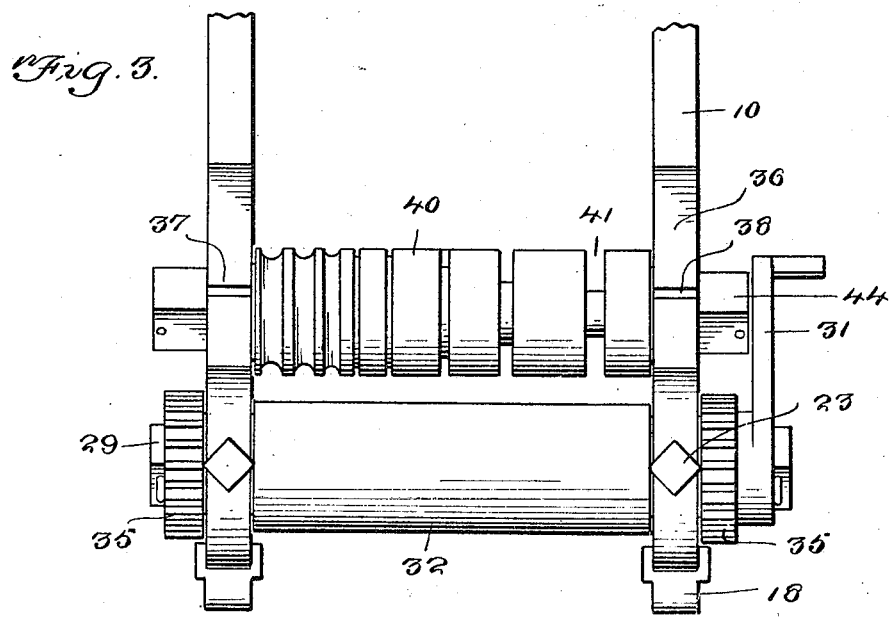

May 1, 1923.
W. N. SCHNEIDER
ANGLE IRON MACHINE
Filed May 28, 1921
1,453,953
3 Sheets-Sheet 3
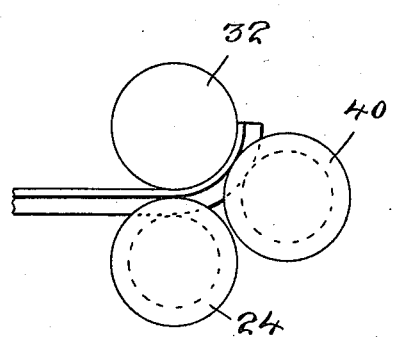
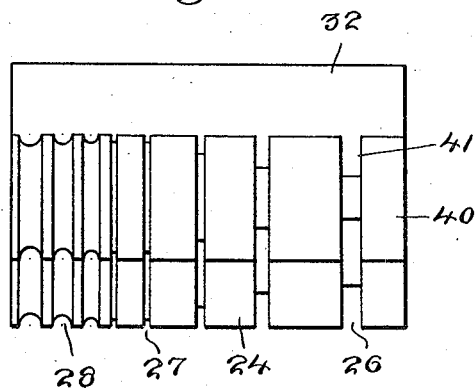
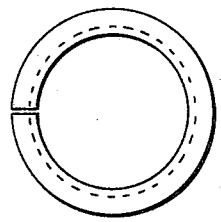
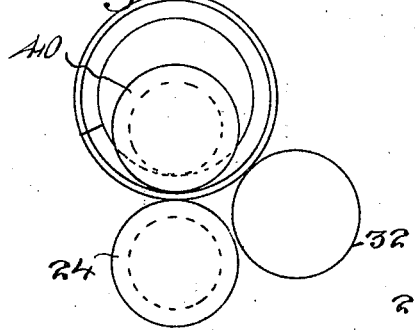
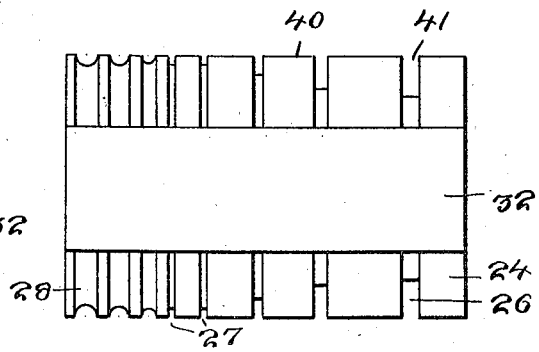
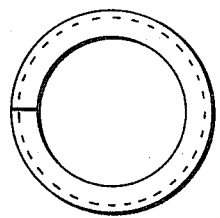
WITNESS: E. R. Ruppert.
W. N. Schneider
INVENTOR
BY Victor J. Evans
ATTORNEY Patented May 1, 1923.

1,453,953

UNITED STATES PATENT OFFICE.

WILLIAM NOALES SCHNEIDER, OF CINCINNATI, OHIO.

ANGLE-IRON MACHINE.

Application filed May 28, 1921. Serial No. 473,464.

*To all whom it may concern:*

Be it known that I, WILLIAM NOALES SCHNEIDER, a citizen of the United States, residing at Cincinnati, in the county of Hamilton and State of Ohio, have invented new and useful Improvements in Angle-Iron Machines, of which the following is a specification.

This invention relates to devices for working upon angle iron of various cross-sectional configurations, and has for its object the provision of a machine for bending or curving angle or channel iron while in a cold state so that the bar of angle iron may be given a greater or less degree of curvature as desired or whereby it may be bent into a complete circular form to provide a ring-like member.

An important object is the provision of a device of this character which may be either power operated or manually operated depending upon the weight of the angle bars to be treated, the device furthermore including a plurality of rollers which are interchangeable for cooperation depending upon the necessity of the particular occasion, or the character of the special work or special material to be worked upon.

Another object is the provision of a machine of this character in which one roller is relatively stationary, that is to say its bearings are stationary, while the other rollers cooperating therewith are adjustable, the adjustability of these rollers adapting the device for use in bending angle bars of different thicknesses.

A further object is the provision of a machine of this character in which the cooperating rollers are formed with grooves of different sizes and shapes whereby the device may be used for forming or bending angle bars of varying types and dimensions.

An additional object is the provision of a device of this character which will be simple and inexpensive in manufacture, easy to operate, highly efficient and durable in service, and a general improvement in the art.

With the above and other objects and advantages in view, the invention consists in the details of construction to be hereinafter more fully described and claimed, and illustrated in the accompanying drawings in which, Figure 1 is an elevation of one end of the machine, Figure 2 is a similar view with the gear wheels removed and showing one of the rollers moved into a position permitting its disengagement from its bearing.

Figure 3 is a plan view of the machine.

Figure 4 is a front elevation.

Figure 5 is a diagrammatic view showing the machine in the act of forming a bend.

Figure 6 is a somewhat diagrammatic rear elevation Figure 5.

Figure 7 is an elevation of one of the ring members completed by the arrangement of the rollers as shown in Figure 5.

Figure 8 is a section through said ring member.

Figure 9 is a similar view as Figure 5 showing a different arrangement of the rollers.

Figure 10 is a diagrammatic rear elevation of Figure 9.

Figure 11 is an elevation of the form of ring member completed by the arrangement of the rollers in Figure 9.

Figure 12 is a section through this last mentioned ring member.

Figure 1:
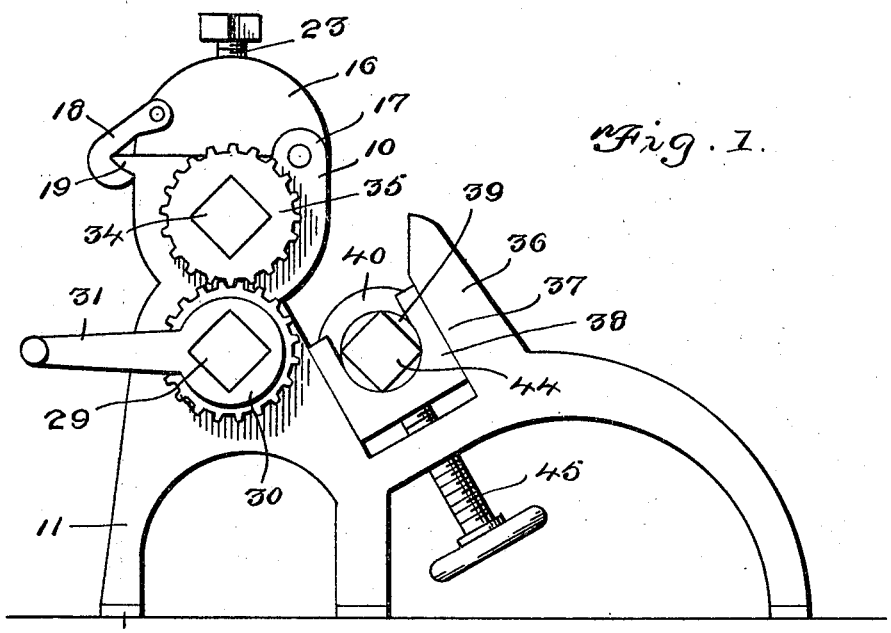
Figure 2:
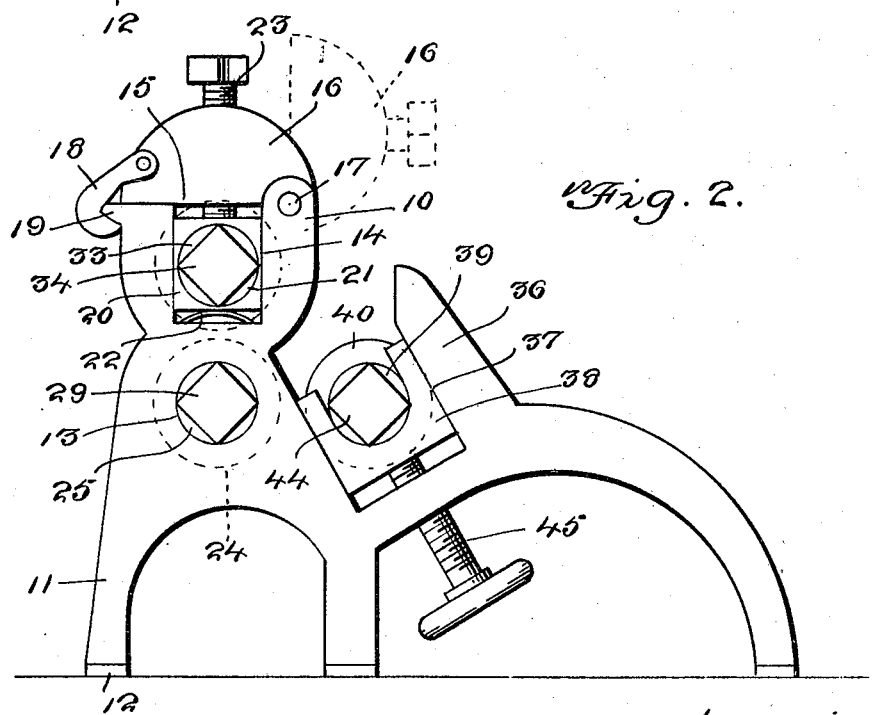

Referring more particularly to the drawings, I have shown my machine as comprising a pair of end frames 10 which are similar in construction and each of which is formed with supporting legs 11 terminating in attaching seats 12 designed to be secured upon a bench or other support. These end frames may be cut away as much as desired at non-essential points whereby to reduce the weight if preferred. Each end of the frame is formed intermediate its ends with a circular bearing 13 and is formed immediately above said circular bearing with a rectangular cut-away portion 14. A cap 16 is hinged as shown at 17 upon the end frame and which is held in position over the cut-away portion 14 by means of a suitable pivoted catch 18 engaging a projection 19 on the end frame.

Slidably mounted within the cooperating or mating recesses 14 and 15 of each end frame are rectangular bearing members 20 formed with circular bearing holes 21 and normally urged upwardly by means of leaf springs 22 disposed between the lower ends of the rectangular bearing members 20 and the bottoms of the recesses 14. Threaded through the cap members 16 are adjusting screws 23 which engage the upper ends of the bearing members 20 and which are for the purpose of moving these members 20 downwardly to a greater or less extent as may be desired.

Disposed between the end frames 10 is a roller 24 which is cylindrical in shape and which has reduced end portions 25 journaled through the bearing openings 13. This roller 24 is provided at one end portion of its larger diameter with a plurality of peripheral grooves 26 which are of different depth and of different width as clearly disclosed. This roller is also provided with a pair of spaced grooves 27 and with a plurality of semi-circular grooves 28 of different diameters. The purpose of these various grooves will be hereinafter made apparent. The end portions of the reduced ends 25 outwardly of the bearing portions which are engaged within the holes 13 are formed square or otherwise angular as indicated at 29 and associated upon the squared ends are gears 30. One extremity of one of the extensions 25 extends a considerable distance beyond the associated gear 30 and is adapted to have secured thereon a drive pulley 31 or a suitable crank handle as may be preferred for the purpose of imparting rotary movement to the roller 24.

I also make use of a roller 32 which is substantially of the same diameter as the roller 24 but which is formed smooth throughout its length, that is not provided with the grooves such as are provided in the roller 24. This roller 32 has its ends formed with reduced extensions 33 which are journaled in the circular openings in the bearing blocks 20 and which have their extremities squared as indicated at 34 and upon these squared ends 34 are secured gears 35 which mesh with the gears 30 carried by the roller 24.

At points spaced from the cut-away portions 14, the end frames 10 are formed with diagonally disposed cut-away portions 36 which open into slots 37 at the upper ends of the frame. Slidably engaged within these cut-away portions 36 are bearing members 38 which are slotted and within which are received the reduced ends 39 of a roller 40 which is identical in construction with the roller 24, that is it is provided in its periphery with a plurality of grooves 41 corresponding to the grooves 26. The extremities of the reduced ends 39 of this roller 40 are squared as indicated so that this roller may be interchangeable with the roller 32 for cooperation with the roller 24. The squared ends 44 of the roller 40 are likewise adapted to have secured thereon the gears 35 in the event that the roller 40 is used in place of the roller 32. Screwed through each end frame 10 is a screw 45 which engages the lower ends of the bearing members 38 whereby the bearing members may be moved or adjusted into the desired position.

The operation of the device is as follows: It is understood that the roller 24 is permanent and that either the roller 40 or 32 may be engaged within the bearing members 20 depending upon the nature or cross-sectional configuration of the angle bars to be bent. In case it is desired to roll a bar which is of right angular shape in cross-section or panel-shaped in cross-section, or round or half round in cross-section, the roller 32 is used as the upper roller in conjunction with the roller 24, and the roller 40 is disposed within the bearing members 38 at the rear of the machine. In carrying out the operation it is of course necessary that the operator turn the roller 24 by means of the pulley 31 or handle member which might be provided, whereupon both the roller 24 and either the roller 40 or 32 as the case may be will be rotated owing to the interengagement of the gears 30 and 35. The bar to be bent or rolled is inserted between the upper and lower one of the front rollers with the flange of the bar disposed within the proper one of the grooves 41. In the event that the bar is semi-circular in cross section, the bar will be disposed within the proper one of the semi-circular grooves 28. This of course depends entirely upon the cross-sectional configuration of the bar. When the bar is inserted between the two front rollers and the rollers are rotated it will be apparent that the bar will be bent upwardly and thence follow the curvature of the roller above the roller 24 to curve said bar into a circular shape as shown in Figure 7 of the drawings. When the rollers are positioned as shown in Figure 5, any desired size of ring can be made from the size of the periphery of the roller 32 and up, simply by adjusting the roller 40, but when the rollers are positioned as shown in Figure 9, it is impossible to make a ring the same size as the periphery of the roller 40, as such a ring could not be taken from the roller; however different larger sizes can be made by adjusting the roller 32. In case it is desired to merely round the bar instead of making it in circular shape, it is necessary that the operator adjust the screw 45 to move the bearing 38 into such position that the roller 40, or 32 as the case may be whichever is disposed within the bearing 38 will be disposed below the juncture of the rollers 32 or 40 and 24, as the case may be, so that the bar being rolled will be held straight and will pass over the rear roller.

When it is desired to roll I beams or T-bars it is necessary that the rollers 24 and 40 be the front rollers and that the roller 32 be disposed at the rear.

From the foregoing description and a study of the drawings it will be apparent that I have thus provided a simply constructed and consequently inexpensive device by means of which angle bars of various shapes may be rolled or bent into curved form to a greater or less extent as may be desired to meet the exigencies of certain conditions.

Having described the invention I claim:

1. A device of the character described comprising end frames, bearings located at the intermediate portions of said frames, a lower roller having reduced ends journaled within said bearings, a bearing at the upper end of each of said end frames, a roller journaled within said second named bearings and designed for cooperating with said first named roller, means for adjusting the bearings of said second named roller, and a third roller detachably journaled within the end frames at the rear of said first named rollers and interchangeable with said second named roller.

2. A device of the character described comprising end frames, bearings located at the intermediate portions of said frames, a lower roller having reduced ends journaled within said bearings, a bearing at the upper end of each of said end frames, a roller journaled within said second named bearings and designed for cooperating with said first named roller, means for adjusting the bearings of said second named roller, and a third roller detachably journaled within the end frames at the rear of said first named rollers and interchangeable with said second named roller, slidable bearing members for said last named roller, and adjusting means for moving said last named bearings whereby to shift the position of the last named roller.

3. A device of the character described comprising a pair of end frames formed intermediate their ends with bearings, a roller journaled permanently within said bearings the upper ends of the frames being formed with cut-away portions, hinged members pivoted upon the upper ends of said frames and adapted to overlie the cut-away portions, means for holding said pivoted portions locked with respect to the end frames, bearing members slidable within said cut-away portions, screw means engaging said bearing members whereby to shift the positions thereof, a roller journaled within said second named bearing members and designed for cooperation with said first named roller, intermeshing gears on the rollers whereby to insure the simultaneous rotation thereof, means for rotating one of said rollers, said rollers being formed in their peripheries with a plurality of corresponding peripheral grooves of different cross-sectional configuration and a third roller detachably journaled between said end frames and adapted to be interchangeable with the second named roller.

4. A device of the character described comprising a pair of end frames formed intermediate their ends with bearings, a roller journaled permanently within said bearings the upper ends of the frames being formed with cut-away portions, hinged members pivoted upon the upper ends of said frames and adapted to overlie the cut-away portions, means for holding said pivoted portions locked with respect to the end frames, bearing members slidable within said cut-away portions, screw means engaging said bearing members whereby to shift the positions thereof, a roller journaled within said second named bearing members and designed for cooperation with said first named roller, intermeshing gears on the rollers whereby to insure the simultaneous rotation thereof, means for rotating one of said rollers, said rollers being formed in their peripheries with a plurality of corresponding peripheral grooves of different cross-sectional configuration and a third roller detachably journaled between said end frames and adapted to be interchangeable with the second named roller, said end frames being formed with cut-away portions, bearing members for said last named rollers slidable within said last named cutaway portion, screw means for adjusting the position of the last named bearing members, said last named roller having a smooth periphery.

WILLIAM NOALES SCHNEIDER.